US012801961B2

(12) United States Patent
Baek et al.

(10) Patent No.: US 12,801,961 B2
(45) Date of Patent: Nov. 17, 2026

(54) QUANTUM COMPUTING DEVICE AND METHOD USING MOBILE ENTANGLE-RESOURCE QUBITS

(71) Applicant: Research & Business Foundation SUNGKYUNKWAN UNIVERSITY, Suwon-si (KR)

(72) Inventors: Seunghyun Baek, Suwon-si (KR); Junki Kim, Suwon-si (KR)

(73) Assignee: Research & Business Foundation SUNGKYUNKWAN UNIVERSITY, Suwon-si (KR)

( * ) Notice: Subject to any disclaimer, the term of this patent is extended or adjusted under 35 U.S.C. 154(b) by 589 days.

(21) Appl. No.: 18/240,422

(22) Filed: Aug. 31, 2023

(65) Prior Publication Data

US 2024/0078458 A1 Mar. 7, 2024

(30) Foreign Application Priority Data

Aug. 31, 2022 (KR) ........................ 10-2022-0109970

(51) Int. Cl.

| | |
|---|---|
| ***G06N 10/20*** | (2022.01) |
| ***B82Y 10/00*** | (2011.01) |
| ***G06N 10/40*** | (2022.01) |
| ***G06N 10/60*** | (2022.01) |

(52) U.S. Cl.

CPC ............. *G06N 10/20* (2022.01); *G06N 10/60* (2022.01); *B82Y 10/00* (2013.01); *G06N 10/40* (2022.01)

(58) Field of Classification Search

CPC ......... G06N 10/00; G06N 10/20; G06N 10/40

See application file for complete search history.

(56) References Cited

U.S. PATENT DOCUMENTS

| | | | | |
|---|---|---|---|---|
| 2004/0119061 A1 | | 6/2004 | Wu et al. | |
| 2021/0034411 A1* | | 2/2021 | Griffin ................... | G06N 5/025 |
| 2021/0273792 A1* | | 9/2021 | Coady ................... | H04L 9/0819 |
| 2022/0138608 A1 | | 5/2022 | Ramette et al. | |
| 2022/0222567 A1* | | 7/2022 | Reagor .................. | G06N 10/40 |

FOREIGN PATENT DOCUMENTS

KR 10-2019-0049715 A1 5/2019

OTHER PUBLICATIONS

Request for the Submission of an Opinion for Korean Patent Application No. 10-2022-0109970, dated May 22, 2025.

Written Decision on Registration for Korean Patent Application No. 10-2022-0109970, dated Oct. 10, 2025.

* cited by examiner

*Primary Examiner* — Shane D Woolwine

(57) ABSTRACT

There is provided a quantum computing method and device. The method comprises generating a pair of communication qubits having a quantum entanglement; transporting each of the pair of communication qubits to two different cores, respectively; executing an operation between a data qubit positioned at each of the two different cores and each of the pair of the communication qubits transported to each of the two different cores; measuring a quantum state of the pair of communication qubits; and executing an operation on the data qubit positioned at each of the two different cores based on a measurement result of the quantum state of the pair of communication qubits.

17 Claims, 6 Drawing Sheets

QUANTUM COMPUTING DEVICE AND METHOD USING MOBILE ENTANGLE-RESOURCE QUBITS

TECHNICAL FIELD

The present disclosure relates to a quantum computing device and method using movable entangled resource qubits, and more specifically, to a quantum computing device and method that performs inter-core communication using qubits in a movable entangled state.

This work was related on a research project of Development of scalable ion-trap quantum computer with mobile ions, and supported by Sungkyunkwan University in 2020.

BACKGROUND

Quantum computing may refer to the field associated with computing systems that utilize quantum mechanical phenomena to manipulate data. In quantum computing, quantum mechanical phenomena such as superposition, where quantum variables can exist in multiple different states simultaneously, and entanglement, where multiple quantum variables are in correlated states regardless of their spatial or temporal separation, may be utilized.

Meanwhile, conventional multi-core ion trap quantum computing architecture can perform communication between data qubits positioned at different cores by directly moving data qubits that store information.

SUMMARY

A technical problem to be solved by the present disclosure is to provide a quantum computing device and method that generates entangled qubits and moves the generated qubits to execute communication between different cores.

In accordance with an aspect of the present disclosure, there is provided a quantum computing method, the method comprises: generating a pair of communication qubits having a quantum entanglement; transporting each of the pair of communication qubits to two different cores, respectively; executing an operation between a data qubit positioned at each of the two different cores and each of the pair of the communication qubits transporting to each of the two different cores; measuring a quantum state of the pair of communication qubits; and executing an operation on the data qubit positioned at each of the two different cores based on a measurement result of the quantum state of the pair of communication qubits.

In addition, the transporting each of the pair of communication qubits may include transporting a first communication qubit among the pair of communication qubits to a first core among the two different cores; and transporting a second communication qubit, which is the other one of the pair of communication qubits, to a second core, which is the other one of the two different cores.

In addition, the executing the operation between the data qubit positioned at each of the two different cores and each of the pair of the communication qubits transported to each of the two different cores may include executing an operation between a first data qubit positioned at the first core and the first communication qubit; and executing an operation between a second data qubit positioned at the second core and the second communication qubit.

In addition, the executing of the operation between the first data qubit and the first communication qubit may include executing a CNOT operation between the first data qubit and the first communication qubit.

In addition, the executing of an operation between the second data qubit and the second communication qubit may include executing a CNOT operation between the second data qubit and the second communication qubit; and executing a Hadamard operation on the second communication qubit.

In addition, the executing the operation on the data qubit positioned at each of the two different cores may include executing an operation on a second data qubit positioned at the second core based on a measurement result of a quantum state of the first communication qubit; and executing an operation on a first data qubit positioned at the first core based on a measurement result of a quantum state of the second communication qubit.

In addition, the communication qubits may be generated to be movable to the two different cores, respectively.

In addition, the data qubits may be positioned within each of the two different cores and the data qubits includes quantum information required for operations.

In accordance with another aspect of the present disclosure, there is provided a quantum computing device, the device comprises: a trap configured to generate communication qubits and store data qubits; and a gate teleportation configured to generate a pair of the communication qubits having a quantum entanglement, transport each of the pair of communication qubits to two different cores, respectively, execute an operation between a data qubit positioned at each of the two different cores and each of the pair of the communication qubit transported to each of the two different cores, measure a quantum state of the pair of communication qubit, execute an operation on the data qubit positioned at each of the two different cores based on the measurement result of the quantum state of the pair of communication qubits.

In addition, the gate teleportation may be configured to transport a first communication qubit of the pair of communication qubits at a first core among the two different cores, and transport a second communication qubit of the pair of communication qubits at a second core, which is the other one of the two different cores.

In addition, the gate teleportation may be configured to execute an operation between the first data qubit positioned at the first core and the first communication qubit and execute an operation between the second data qubit positioned at the second core and the second communication qubit.

In addition, the gate teleportation may be configured to execute a CNOT operation between the first data qubit and the first communication qubit.

In addition, the gate teleportation may be configured to execute a CNOT operation between the second data qubit and the second communication qubit and execute a Hadamard operation on the second communication qubit.

In addition, the gate teleportation may be configured to execute an operation on the second data qubit positioned at the second core based on a measurement result of a quantum state of the first communication qubit, and execute an operation on the first data qubit positioned at the first core based on a measurement result of a quantum state of the second communication qubit.

In addition, the communication qubits may be qubits generated to be movable to the two different cores, respectively.

In addition, the data qubits may be qubits positioned within each of the two different cores and the data qubits may include quantum information required for operations.

In accordance with another aspect of the present disclosure, there is provided a non-transitory computer-readable recording medium storing a computer program, which comprises instructions for a processor to perform a quantum computing method, the method comprises: generating a pair of communication qubits having a quantum entanglement; transporting each of the pair of communication qubits to two different cores, respectively; executing an operation between a data qubit positioned at each of the two different cores and each of the pair of the communication qubits transported to each of the two different cores; measuring a quantum state of the pair of communication qubits; and executing an operation on the data qubit positioned at each of the two different cores based on a measurement result of the quantum state of the pair of communication qubits.

According to one aspect of the present disclosure described above, with a quantum computing device and method using entangled resource qubits, it is possible to generate qubits in an entangled state and move the generated qubits to execute communication between different cores.

DETAILED DESCRIPTION

Figure 1:
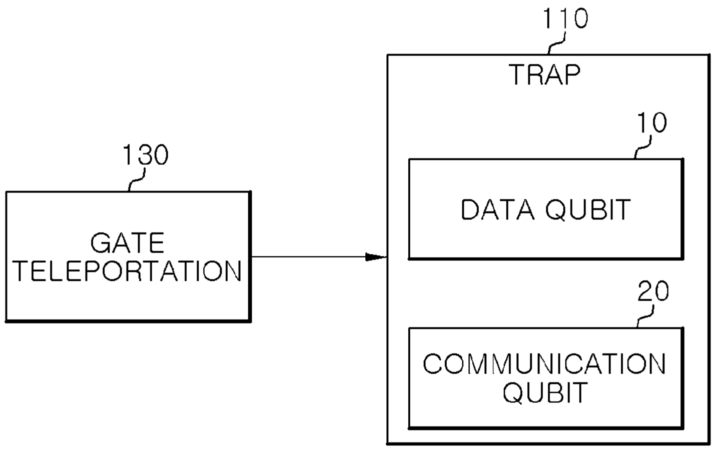
FIG. 1 is a block diagram of a quantum computing device according to an embodiment of the present disclosure.

The advantages and features of the embodiments and the methods of accomplishing the embodiments will be clearly understood from the following description taken in conjunction with the accompanying drawings. However, embodiments are not limited to those embodiments described, as embodiments may be implemented in various forms. It should be noted that the present embodiments are provided to make a full disclosure and also to allow those skilled in the art to know the full range of the embodiments. Therefore, the embodiments are to be defined only by the scope of the appended claims.

Terms used in the present specification will be briefly described, and the present disclosure will be described in detail.

In terms used in the present disclosure, general terms currently as widely used as possible while considering functions in the present disclosure are used. However, the terms may vary according to the intention or precedent of a technician working in the field, the emergence of new technologies, and the like. In addition, in certain cases, there are terms arbitrarily selected by the applicant, and in this case, the meaning of the terms will be described in detail in the description of the corresponding invention. Therefore, the terms used in the present disclosure should be defined based on the meaning of the terms and the overall contents of the present disclosure, not just the name of the terms.

When it is described that a part in the overall specification "includes" a certain component, this means that other components may be further included instead of excluding other components unless specifically stated to the contrary.

In addition, a term such as a "unit" or a "portion" used in the specification means a software component or a hardware component such as FPGA or ASIC, and the "unit" or the "portion" performs a certain role. However, the "unit" or the "portion" is not limited to software or hardware. The "portion" or the "unit" may be configured to be in an addressable storage medium, or may be configured to reproduce one or more processors. Thus, as an example, the "unit" or the "portion" includes components (such as software components, object-oriented software components, class components, and task components), processes, functions, properties, procedures, subroutines, segments of program code, drivers, firmware, microcode, circuits, data, database, data structures, tables, arrays, and variables. The functions provided in the components and "unit" may be combined into a smaller number of components and "units" or may be further divided into additional components and "units".

Hereinafter, the embodiment of the present disclosure will be described in detail with reference to the accompanying drawings so that those of ordinary skill in the art may easily implement the present disclosure. In the drawings, portions not related to the description are omitted in order to clearly describe the present disclosure.

Hereinafter, preferred embodiments of the present disclosure will be described in detail with reference to the attached drawings.

FIG. 1 is a block diagram of a quantum computing device according to an embodiment of the present disclosure.

Referring to FIG. 1, a quantum computing device 100 may include a trap 110 and a gate teleportation 130.

The trap 110 may be provided to generate the communication qubit 20 and have a data qubit 10 positioned therein. In this case, the communication qubit 20 may be a qubit generated to be movable, and the data qubit 10 may be a qubit positioned within each core where quantum information required for operations can be stored.

In this regard, each qubit refers to the basic operation unit of quantum computing, and the communication qubit 20 and the data qubit 10 may be implemented to be movable, such as a neutral atom or ion.

Thus, the trap 110 may be configured to fix or transport individual qubits within the trap 110 using an RF electromagnetic field.

Meanwhile, the gate teleportation 130 may control the RF electromagnetic field to fix or transport individual qubits within the trap 110. In addition, the gate teleportation 130 may measure the state of a qubit and execute an operation on the qubit.

In doing so, the gate teleportation 130 may transport only the communication qubit 20 to execute an operation between data qubits 10 positioned at different cores, respectively.

In this regard, the quantum computing device 100 may execute a CNOT operation between the data qubits 10 positioned at the different cores, respectively. Therefore, by using the CNOT operation, the quantum computing device 100 may execute various operations between the data qubits 10 positioned at the different cores, respectively.

Meanwhile, the trap 110 and the gate teleportation 130 shown in FIG. 1 are conceptually divided structures of the quantum computing device 100 for ease of describing the structure of the quantum computing device 100, and aspects of the present disclosure are not limited thereto. In some embodiments, the functions of the trap 110 and the gate teleportation 130 may be implemented to be merged or separated.

Figure 2:
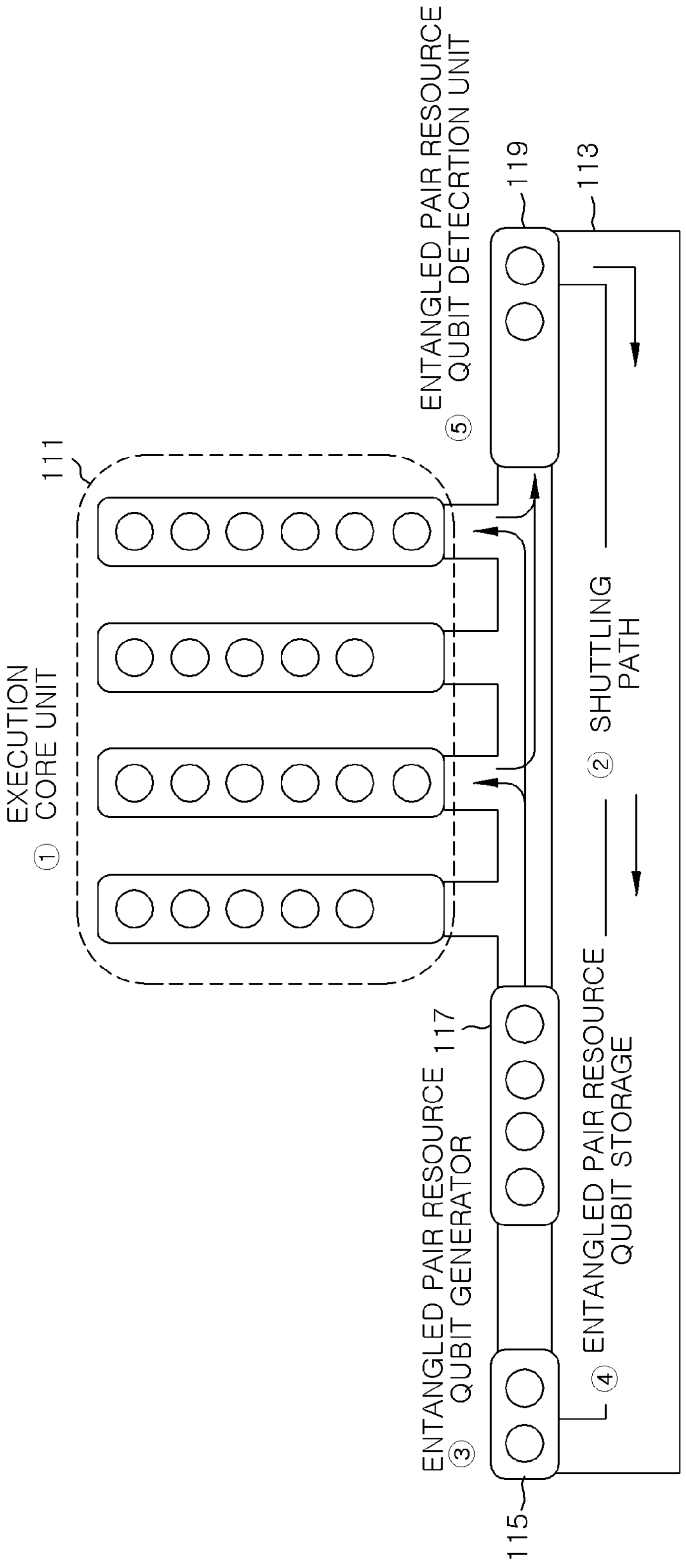
FIG. 2 is a diagram showing an embodiment of a trap shown in FIG. 1.

FIG. 2 is a diagram showing an embodiment of a trap shown in FIG. 1.

Referring to FIG. 2, the trap 110 may include an execution core unit 111, a shuttling path 113, an entangled pair resource qubit generator 115, an entangled pair resource qubit storage 117, and an entangled pair resource qubit measuring unit 119.

The execution core unit 111 may include a plurality of cores, and the data qubit 10 may be positioned at each of these cores. That is, the execution core unit 111 may be provided in a multi-core form.

Thus, the gate teleportation 130 may execute an operation on the data qubit 10 using the execution core unit 111.

The shuttling path 113 may be provided for qubits to transport. That is, the shuttling path 113 may be a space through which the communication qubit 20 transport. Thus, the gate teleportation 130 may transport the communication qubit 20 to any one of the execution core unit 111, the entangled pair resource qubit generator 115, and the entangled pair resource qubit storage 117 through the shuttling path 113.

In this regard, in FIG. 2, dashed circles may represent communication qubits 20 and empty circles may represent data qubits 10. However, these expressions are intended to aid understanding of the present disclosure, and in some embodiments, the same type of qubit or different types of qubits may be used for the communication qubit 20 and the data qubit 10.

The entangled pair resource qubit generator 115 may be configured to generate communication qubits 20 and control two different communication qubits 20 in an entangled state. At this point, a pair of qubits in the entangled state may be referred to as entangled pair resource qubits.

Thus, the gate teleportation 130 may generate a pair of communication qubits 20 in the entangled state using the entangled pair resource qubit generator 115.

The entangled pair resource qubit storage 117 may be provided to store the pair of communication qubits 20 generated by the entangled pair resource qubit generator 115.

In addition, the entangled pair resource qubit measuring unit 119 may be provided to measure the state of a qubit. For example, the entangled pair resource qubit measuring unit 119 may measure a spin of the qubit to determine the qubit. Thus, the gate teleportation 130 may measure the state of the communication qubit 20 using the entangled pair resource qubit measuring unit 119.

In this regard, referring to FIGS. 1 and 2, the gate teleportation 130 may generate a pair of communication qubits 20 in the Entangled state, and position (or transport) the pair of communication qubits 20 at two different cores, respectively.

At this point, the gate teleportation 130 may generate the pair of communication qubits 20 in the entangled state using the entangled pair resource qubit generator 115, and position (or transport) the generated pair of communication qubits 20 at the entangled pair resource qubit storage 117.

Accordingly, the gate teleportation 130 may position (or transport) the pair of communication qubits 20, which are stored in the entangled pair resource qubit storage 117, at the execution core unit 111.

For example, if the two cores include a first core and a second core and the pair of communication qubits 20 includes a first communication qubit and a second communication qubit, the gate teleportation 130 may transport the first communication qubit to the first core and the second communication qubit to the second core.

Accordingly, the gate teleportation 130 may execute operations between data qubits 10 positioned at the different cores and the communication qubits 20 transported to the respective cores.

For example, the gate teleportation 130 execute an operation between a first data qubit and first communication qubit positioned at the first core, and an operation between a second data qubit and second communication qubit positioned at the second core.

In this case, the entangled state of the first data qubit and the second data qubit may be created by a pair of communication qubits 20 in the entangled state without direct interaction with the data qubit 10.

Accordingly, the gate teleportation 130 may measure the pair of communication qubits 20. To this end, the gate teleportation 130 may transport a pair of communication qubits 20 positioned at the execution core unit 111 to the entangled pair resource qubit measuring unit 119, and measure the state of the pair of communication qubits 20 using the entangled pair resource qubit measuring unit 119.

The gate teleportation 130 may execute an operation on each data qubit 10 positioned at each core based on a measurement result.

For example, the gate teleportation 130 may execute an operation on the second data qubit based on a measurement result of the first communication qubit, and execute an operation on the first data qubit based on a measurement result of the second communication qubit.

Figure 3:
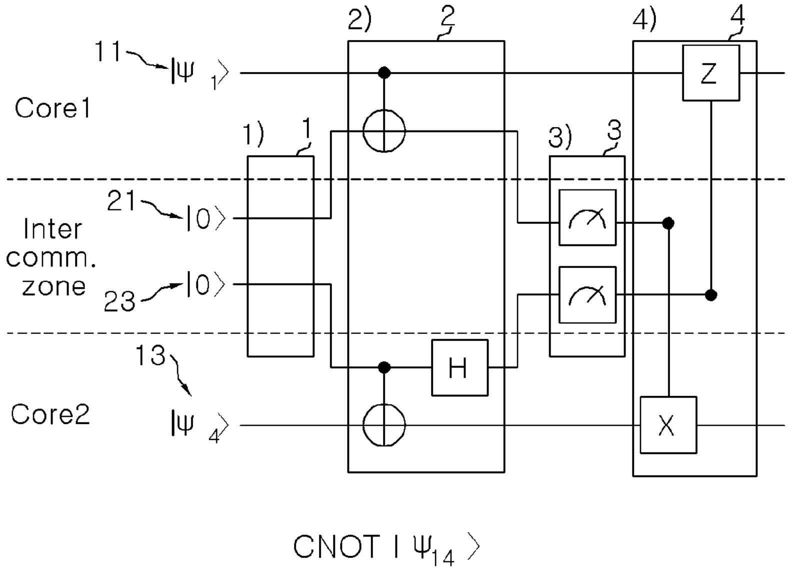
FIG. 3 is a circuit diagram showing CNOT operation between different cores by gate teleportation shown in FIG. 1.

FIG. 3 is a circuit diagram showing CNOT operation between different cores by gate teleportation shown in FIG. 1.

Referring to FIG. 3, a first data qubit 11 positioned at a first core and a second data qubit 13 positioned at a second core may be observed, and a first communication qubit 21 and a second communication qubit 23 in the entangled state may be observed.

At this point, 1) referring to the entangled state generation unit, it is possible to check a pair of communication qubits 20 in the entangled state created by the gate teleportation 130.

In addition, 2) referring to the first operation unit, the gate teleportation 130 may transport the generated pair of communication qubits 20 to two different cores, respectively, and execute an operation between a data qubit 10 and a communication qubit 20 positioned at each core.

That is, the gate teleportation 130 may transport the first communication qubit 21 to the first core and the second communication qubit 23 to the second core.

Accordingly, the gate teleportation 130 may execute an operation between the first data qubit 11 and the first communication qubit 21. At this point, the operation between the first data qubit 11 and the first communication qubit 21 may be a CNOT operation.

In addition, the gate teleportation 130 may execute an operation between the second data qubit 13 and the second communication qubit 23. At this point, the operation between the second data qubit 13 and the second communication qubit 23 may be a CNOT operation or a Hadamard operation.

Here, the CNOT operation is an operation executed by the Controlled X Gate, where the qubit's state remains unchanged when the qubit is in the state of 0, whereas the state is changed to 0 when the qubit is in the state of 1.

In addition, the Hadamard operation may convert a qubit with an initial state of 0 or 1 into a superposed state of both 0 and 1.

Meanwhile, 3) referring to the measuring unit, it is possible to check a process of measuring the state of a pair of communication qubits 20 by gate teleportation 130. To this end, the gate teleportation 130 may transport a pair of communication qubits 20 from respective cores to the entangled pair resource qubit measuring unit 119.

Accordingly, 4) referring to the second operation unit, the gate teleportation 130 may execute an operation on data qubits 10 positioned at the respective cores based on measurement results of the communication qubits 20.

That is, the gate teleportation 130 may execute X operation on the second data qubit 13 based on a measurement result of the first communication qubit 21, and execute Z operation on the first data qubit 11 based on a measurement result of the second communication qubit 23.

Here, the X operation is an operation executed by the X Gate, where a qubit's state is changed to 1 when the qubit is in the state of 0, whereas the state is changed to 0 when the qubit is in the state of 1.

In addition, the Z operation is an operation by the Z Gate, which rotates a qubit in a superposition state around the Z-axis by an angle of $\pi$.

In doing so, the gate teleportation 130 may implement a CNOT operation between different cores without moving the data qubits 10 positioned at the respective cores.

Accordingly, the quantum computing device 100 may execute various operations between the different cores using a CNOT circuit as described above.

Figure 4:
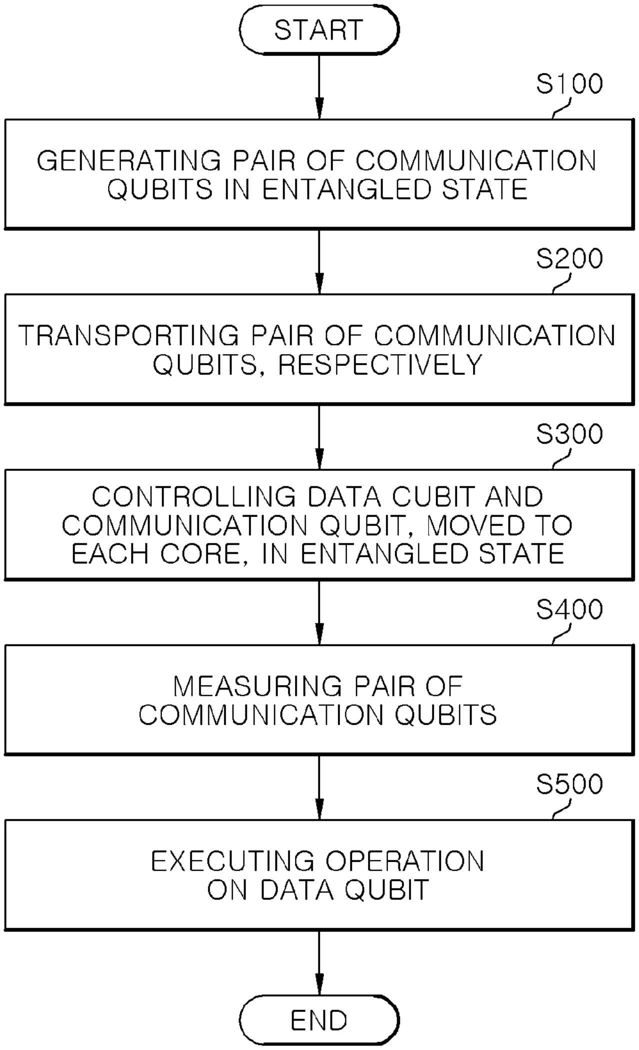
FIG. 4 is a flowchart of a quantum computing method according to an embodiment of the present disclosure.

FIG. 4 is a flowchart of a quantum computing method according to an embodiment of the present disclosure.

Referring to FIG. 4, the gate teleportation 130 may generate a pair of communication qubits 20 in an entangled state (S100) and transport the pair of communication qubits 20 to two different cores, respectively (S200).

Accordingly, the gate teleportation 130 may execute operations between data qubits 10 positioned at the cores and the communication qubits 20 transported to the respective cores (S300).

At this point, the gate teleportation 130 may measure the pair of communication qubits (S400) and execute an operation on the data qubits 10 positioned at the respective cores based on measurement results (S500).

Figure 5:
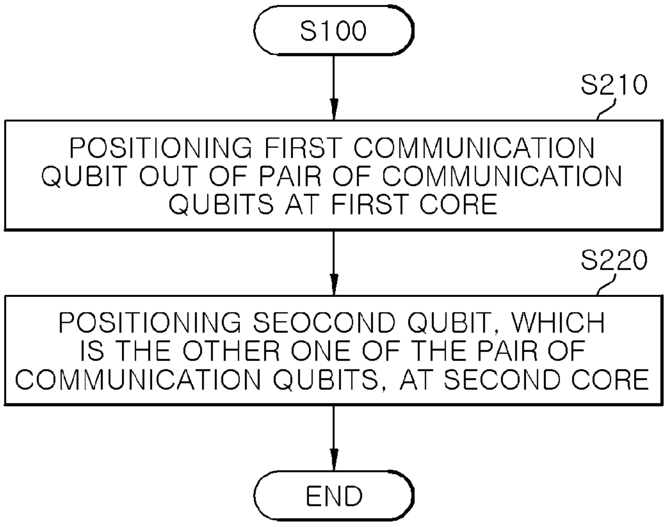
FIG. 5 is a detailed flowchart of moving each pair of communication qubits shown in FIG. 4.

FIG. 5 is a detailed flowchart of moving each pair of communication qubits shown in FIG. 4.

Referring to FIG. 5, the gate teleportation 130 may position (or transport) a first communication qubit 21 of a pair of communication qubits 20 at a first core out of cores (S210).

In addition, the gate teleportation 130 may position (or transport) a second communication qubit 23, which is the other one of the pair of communication qubits 20, at the second core, which is the other one of the cores (S220).

Figure 6:
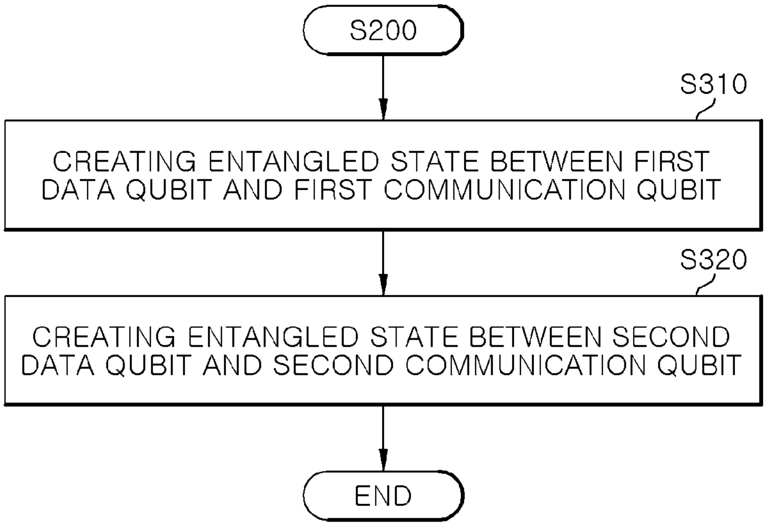
FIG. 6 is a detailed flowchart of steps for executing operations between data qubits of FIG. 4 and communication qubits moved to each core.

FIG. 6 is a detailed flowchart of steps for executing operations between data qubits of FIG. 4 and communication qubits transported to each core.

Referring to FIG. 6, the gate teleportation 130 may execute an operation between the first data qubit 11 and first communication qubit 21 positioned at the first core (S310).

In addition, the gate teleportation 130 may execute an operation between the second data qubit 13 and second communication qubit 23 positioned at the second core (S320).

Figure 7:
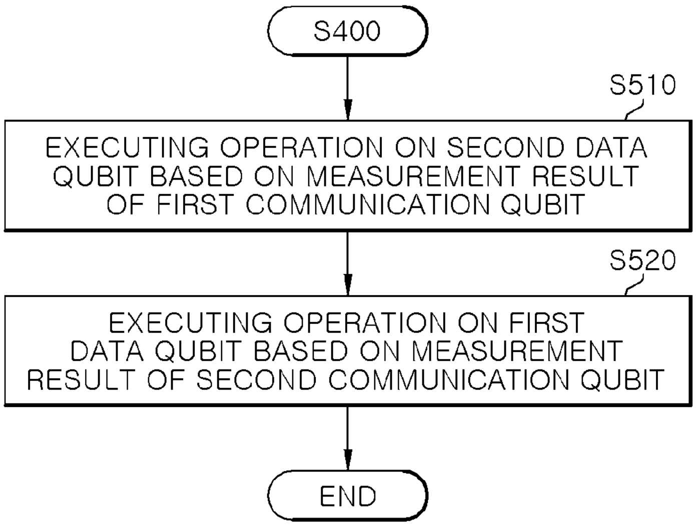
FIG. 7 is a detailed flowchart of executing operations on the data qubits of FIG. 4.

FIG. 7 is a detailed flowchart of executing operations on the data qubits of FIG. 4.

Referring to FIG. 7, the gate teleportation 130 may execute an operation on the second data qubit 13 positioned at the second core based on a measurement result of the first communication qubit 21 (S510).

In addition, the gate teleportation 130 may execute an operation on the first data qubit 11 positioned at the first core based on a measurement result of the second communication qubit 23 (S520).

Combinations of steps in each flowchart attached to the present disclosure may be executed by computer program instructions. Since the computer program instructions can be mounted on a processor of a general-purpose computer, a special purpose computer, or other programmable data processing equipment, the instructions executed by the processor of the computer or other programmable data processing equipment create a means for performing the functions described in each step of the flowchart. The computer program instructions can also be stored on a computer-usable or computer-readable storage medium which can be directed to a computer or other programmable data processing equipment to implement a function in a specific manner. Accordingly, the instructions stored on the computer-usable or computer-readable recording medium can also produce an article of manufacture containing an instruction means which performs the functions described in each step of the flowchart. The computer program instructions can also be mounted on a computer or other programmable data processing equipment. Accordingly, a series of operational steps are performed on a computer or other programmable data processing equipment to create a computer-executable process, and it is also possible for instructions to perform a computer or other programmable data processing equipment to provide steps for performing the functions described in each step of the flowchart.

In addition, each step may represent a module, a segment, or a portion of codes which contains one or more executable instructions for executing the specified logical function(s). It should also be noted that in some alternative embodiments, the functions mentioned in the steps may occur out of order. For example, two steps illustrated in succession may in fact be performed substantially simultaneously, or the steps may sometimes be performed in a reverse order depending on the corresponding function.

The above description is merely exemplary description of the technical scope of the present disclosure, and it will be understood by those skilled in the art that various changes and modifications can be made without departing from original characteristics of the present disclosure. Therefore, the embodiments disclosed in the present disclosure are intended to explain, not to limit, the technical scope of the present disclosure, and the technical scope of the present disclosure is not limited by the embodiments. The protection scope of the present disclosure should be interpreted based on the following claims and it should be appreciated that all technical scopes included within a range equivalent thereto are included in the protection scope of the present disclosure.

What is claimed is:

1. A quantum computing method, the method comprising:

generating a pair of communication qubits having a quantum entanglement;

physically transporting each of the pair of communication qubits to two different cores via a shuttling path, respectively, while maintaining the quantum entanglement between the pair of communication qubits during the physical transport via the shuttling path;

executing an operation between a data qubit positioned at each of the two different cores and each of the pair of the communication qubits physically transported to each of the two different cores;

measuring a quantum state of the pair of communication qubits; and executing an operation on the data qubit positioned at each of the two different cores based on a measurement result of the quantum state of the pair of communication qubits.

2. The quantum computing method of claim 1, wherein the physically transporting each of the pair of communication qubits includes:

physically transporting a first communication qubit among the pair of communication qubits to a first core among the two different cores via the shuttling path; and physically transporting a second communication qubit, which is the other one of the pair of communication qubits, to a second core, which is the other one of the two different cores via the shuttling path.

3. The quantum computing method of claim 2, wherein the executing the operation between the data qubit positioned at each of the two different cores and each of the pair of the communication qubits physically transported to each of the two different cores includes:

executing an operation between a first data qubit positioned at the first core and the first communication qubit at the first core; and executing an operation between a second data qubit positioned at the second core and the second communication qubit at the second core.

4. The quantum computing method of claim 3, wherein the executing of the operation between the first data qubit and the first communication qubit includes executing a CNOT operation between the first data qubit and the first communication qubit after the first communication qubit is physically transported to the first core.

5. The quantum computing method of claim 3, wherein the executing of an operation between the second data qubit and the second communication qubit includes:

executing a CNOT operation between the second data qubit and the second communication qubit after the second communication qubit is physically transported to the second core; and executing a Hadamard operation on the second communication qubit at the second core.

6. The quantum computing method of claim 2, wherein the executing the operation on the data qubit positioned at each of the two different cores includes:

executing an operation on a second data qubit positioned at the second core based on a measurement result of a quantum state of the first communication qubit; and executing an operation on a first data qubit positioned at the first core based on a measurement result of a quantum state of the second communication qubit.

7. The quantum computing method of claim 1, wherein the communication qubits are generated at an entangled pair resource qubit generator and are movable to the two different cores along the shuttling path.

8. The quantum computing method of claim 1, wherein the data qubits are fixedly positioned within each of the two different cores, and each core includes an interaction zone for performing the operations between the data qubit and the physically transported communication qubit.

9. A quantum computing device, the device comprising:

a trap configured to generate communication qubits and store data qubits; and a gate teleportation configured to:

generate a pair of the communication qubits having a quantum entanglement;

physically transport each of the pair of communication qubits to two different cores via a shuttling path, respectively, while maintaining the quantum entanglement during the physical transport;

execute an operation between a data qubit positioned at each of the two different cores and each of the pair of the communication qubit physically transported to each of the two different cores;

measure a quantum state of the pair of communication qubit; and execute an operation on the data qubit positioned at each of the two different cores based on the measurement result of the quantum state of the pair of communication qubits.

10. The quantum computing device of claim 9, wherein the gate teleportation is configured to physically transport a first communication qubit of the pair of communication qubits to a first core among the two different cores via the shuttling path, and physically transport a second communication qubit of the pair of communication qubits to a second core, which is the other one of the two different cores via the shuttling path.

11. The quantum computing device of claim 10, wherein the gate teleportation is configured to execute an operation between the first data qubit positioned at the first core and the first communication qubit at the first core and execute an operation between the second data qubit positioned at the second core and the second communication qubit at the second core.

12. The quantum computing device of claim 11, wherein the gate teleportation is configured to execute a CNOT operation between the first data qubit and the first communication qubit after the first communication qubit is physically transported to the first core.

13. The quantum computing device of claim 11, wherein the gate teleportation is configured to execute a CNOT operation between the second data qubit and the second communication qubit after the second communication qubit is physically transported to the second core and execute a Hadamard operation on the second communication qubit at the second core.

14. The quantum computing device of claim 10, wherein the gate teleportation is configured to execute an operation on the second data qubit positioned at the second core based on a measurement result of a quantum state of the first communication qubit, and execute an operation on the first data qubit positioned at the first core based on a measurement result of a quantum state of the second communication qubit.

15. The quantum computing device of claim 9, wherein the communication qubits are generated at an entangled pair resource qubit generator and are movable to the two different cores, respectively, along the shuttling path.

16. The quantum computing device of claim 9, wherein the data qubits are fixedly positioned within each of the two different cores and each core includes an interaction zone for performing the operations between the data qubit and the physically transported communication qubit, and the data qubits includes quantum information required for operations.

17. A non-transitory computer readable-storage medium storing computer executable instructions, wherein the instructions, when executed by a processor, cause the processor to perform a quantum computing method, the method comprising:

generating a pair of communication qubits having a quantum entanglement;

physically transporting each of the pair of communication qubits to two different cores via a shuttling path, respectively, while maintaining the quantum entanglement between the pair of communication qubits during the physical transport via the shuttling path;

executing an operation between a data qubit positioned at each of the two different cores and each of the pair of the communication qubits physically transported to each of the two different cores;

measuring a quantum state of the pair of communication qubits; and executing an operation on the data qubit positioned at each of the two different cores based on a measurement result of the quantum state of the pair of communication qubits.

* * * * *